United States Patent
Subramanian et al.

(10) Patent No.: US 10,250,500 B2
(45) Date of Patent: Apr. 2, 2019

(54) PERFORMING A SERVICE ON A PACKET

(71) Applicant: Juniper Networks, Inc., Sunnyvale, CA (US)

(72) Inventors: Saravanadas P. Subramanian, San Jose, CA (US); Jacopo Pianigiani, Cupertino, CA (US); Dhiraj D. Ballal, Santa Clara, CA (US); Christian Lambert, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 148 days.

(21) Appl. No.: 15/395,163

(22) Filed: Dec. 30, 2016

(65) Prior Publication Data

US 2018/0191612 A1    Jul. 5, 2018

(51) Int. Cl.
  *H04L 12/741* (2013.01)
  *H04L 12/721* (2013.01)
  *H04L 12/725* (2013.01)
  *H04L 12/723* (2013.01)

(52) U.S. Cl.
  CPC ............ *H04L 45/74* (2013.01); *H04L 45/306* (2013.01); *H04L 45/44* (2013.01); *H04L 45/50* (2013.01); *H04L 45/72* (2013.01)

(58) Field of Classification Search
  CPC ... H04L 63/0236; H04L 43/028; H04L 45/44; H04L 45/50; H04L 45/72
  See application file for complete search history.

(56) References Cited

U.S. PATENT DOCUMENTS

| | | | |
|---|---|---|---|
| 7,031,262 | B2 | 4/2006 | Vasseur et al. |
| 7,599,349 | B2 | 10/2009 | Vasseur et al. |
| 2008/0267187 | A1 | 10/2008 | Kulmala et al. |
| 2014/0206403 | A1* | 7/2014 | Buckley ............... H04W 4/14 455/466 |
| 2014/0313928 | A1 | 10/2014 | Fernando et al. |
| 2014/0351452 | A1 | 11/2014 | Bosch et al. |

(Continued)

FOREIGN PATENT DOCUMENTS

| | | |
|---|---|---|
| EP | 2154834 A1 | 2/2010 |
| EP | 2963866 A2 | 1/2016 |

OTHER PUBLICATIONS

Wikipedia, "Firewall (computing)," https://en.wikipedia.org/wiki/Firewall_(computing)#First_generation:_packet_filters, Dec. 21, 2016, 7 pages.

(Continued)

*Primary Examiner* — Romani Ohri
(74) *Attorney, Agent, or Firm* — Harrity & Harrity, LLP

(57) ABSTRACT

A first device may receive first route information, from a second device, identifying a first route to the second device for a packet to be provided toward a destination via the second device. The first device may generate second route information identifying a second route to the first device for the packet. The first device may provide the second route information to a third device. The packet is to be received by the first device. The first device may receive the packet from the third device via the second route after providing the second route information to the third device. The packet is to be provided to the second device by the first device. The first device may perform a service on the packet based on being identified by the second route information as a next hop for the packet and prior to providing the packet to the second device.

20 Claims, 8 Drawing Sheets

(56) References Cited

U.S. PATENT DOCUMENTS

| | | | | |
|---|---|---|---|---|
| 2014/0366119 | A1* | 12/2014 | Floyd, III | H04L 63/20 726/13 |
| 2015/0312055 | A1 | 10/2015 | Varga et al. | |
| 2016/0043951 | A1* | 2/2016 | Srinivas | H04L 67/1027 370/392 |
| 2016/0065503 | A1* | 3/2016 | Yohe | H04L 49/70 370/389 |
| 2016/0142293 | A1* | 5/2016 | Hu | H04L 45/38 370/392 |
| 2016/0308762 | A1* | 10/2016 | Teng | H04L 45/50 |
| 2016/0352865 | A1* | 12/2016 | Gupta | H04L 67/42 |
| 2017/0093698 | A1* | 3/2017 | Farmanbar | H04L 45/38 |
| 2017/0237656 | A1* | 8/2017 | Gage | H04L 45/74 370/392 |
| 2018/0041247 | A1* | 2/2018 | Zakaria | H04B 3/542 |

OTHER PUBLICATIONS

Juniper Networks, "Interprovider VPNs," http://www.juniper.net/documentation/en_US/junos16.1/topics/concept/vpn-interprovider-vpns.html, May 30, 2016, 2 pages.

Wikipedia, "Multiprotocol Label Switching," https://en.wikipedia.org/wiki/Multiprotocol_Label_Switching#Label-switched_path, Dec. 28, 2016, 9 pages.

Wikipedia, "Autonomous system (Internet)," https://en.wikipedia.org/wiki/Autonomous_system_(Internet), Dec. 6, 2016, 3 pages.

Getnetworking.net, "BGP next-hop-self," http://www.getnetworking.net/bgp/bgp-next-hop-self, Nov. 18, 2012, 8 pages.

Extended European Search Report corresponding to EP 17164334.9 dated Dec. 1, 2017, 11 pages.

\* cited by examiner

PERFORMING A SERVICE ON A PACKET

BACKGROUND

Within the Internet, an autonomous system (AS) may include a collection of connected Internet Protocol (IP) network devices whose prefixes and routing policies are under common administrative control. In other words, an AS may represent a connected group of one or more blocks of IP addresses, called IP prefixes, that have been assigned to an organization and provides a single routing policy to systems outside the AS. The routing may be between ASs (e.g., inter-AS routing), where the routing is external to an AS and allows one AS to send traffic to another AS. The organization to which the connected group of one or more IP addresses have been assigned may be a network service provider, a company, a university, a division of a company, a group of companies, and/or the like.

SUMMARY

According to some possible implementations, a first device may include one or more processors to receive first route information from a second device. The first route information may identify the second device as a next hop for a packet to be sent toward a destination other than the first device. The one or more processors may generate second route information based on receiving the first route information. The second route information may identify the first device as the next hop for the packet when the packet is to be sent toward the destination. The one or more processors may provide the second route information to a third device based on generating the second route information. The third device may be a source of the packet to be sent to the destination. The one or more processors may receive the packet from the third device after providing the second route information to the third device. The packet is to be provided to the destination via the second device. The one or more processors may perform a service on the packet based on receiving the packet from the third device. The service may be performed on the packet prior to providing the packet to the second device. The one or more processors may perform the service based on the first device being identified by the second route information as the next hop for the packet. The one or more processors may perform an action related to the packet based on performing the service on the packet.

According to some possible implementations, a non-transitory computer-readable medium may store one or more instructions that, when executed by one or more processors of a first device, cause the one or more processors to receive first route information from a second device. The first route information may identify a first route to the second device for a packet to be provided toward a destination via the second device. The one or more instructions, when executed by the one or more processors, may cause the one or more processors to generate second route information based on receiving the first route information. The second route information may identify a second route to the first device for the packet. The one or more instructions, when executed by the one or more processors, may cause the one or more processors to provide the second route information to a third device based on generating the second route information. The packet is to be received by the first device based on the second route information. The one or more instructions, when executed by the one or more processors, may cause the one or more processors to receive the packet from the third device via the second route after providing the second route information to the third device. The packet is to be provided to the second device by the first device. The one or more instructions, when executed by the one or more processors, may cause the one or more processors to perform a service on the packet based on receiving the packet from the third device. The service may be performed on the packet prior to providing the packet to the second device. The first device may perform the service based on being identified by the second route information as a next hop for the packet.

According to some possible implementations, a method may include receiving, by a first device and from a second device, first route information. The first route information may identify the second device as a next hop for a packet. The method may include generating, by the first device, second route information based on receiving the first route information. The second route information may identify the first device as the next hop for the packet. The packet is to be provided toward a destination via the second device. The method may include providing, by the first device, the second route information to a third device based on generating the second route information. The second route information may permit the third device to provide the packet to the first device. The method may include receiving, by the first device and from the third device, the packet after providing the second route information to the third device. The first device may receive the packet from the third device based on the second route information identifying the first device as the next hop for the packet. The method may include performing, by the first device, a service on the packet prior to providing the packet toward the destination based on receiving the packet from the third device. The method may include performing, by the first device, an action related to the packet based on performing the service on the packet.

DETAILED DESCRIPTION

The following detailed description of example implementations refers to the accompanying drawings. The same reference numbers in different drawings may identify the same or similar elements.

Multiple connected autonomous systems (ASs) may form an inter-AS network. A packet (e.g., a formatted unit of data) may be provided between the ASs or other types of networks. Some inter-AS networks use a label, or other information, to make forwarding decisions related to the packet and to provide the packet from a source toward a destination. In this case, a network device associated with one AS (e.g., a local AS) may not have a technique for performing a service related to the packet (e.g., a firewall service, a deep packet inspection service, or the like) when the packet is received from another AS (e.g., a remote AS). For example, because the packet has a label that is used for forwarding decisions, the network device may not be capable of performing a service on the content of the packet prior to forwarding the packet to another network device due to the packet being encapsulated by the label.

Implementations described herein enable a network device (e.g., a service network device), associated with a local AS (or another type of network), to perform a service on a packet, such as a packet that has a label (e.g., prior to forwarding the packet based on the label), when the packet is not destined for the network device. In this way, the network device increases security by performing the service prior to forwarding the packet (e.g., within the local AS, to a remote AS, or to another type of network). In addition, this improves network communications, and/or conserves processing resources that would be consumed due to an unserviced packet, such as when the packet contains a virus or other malicious content.

Figure 1A:
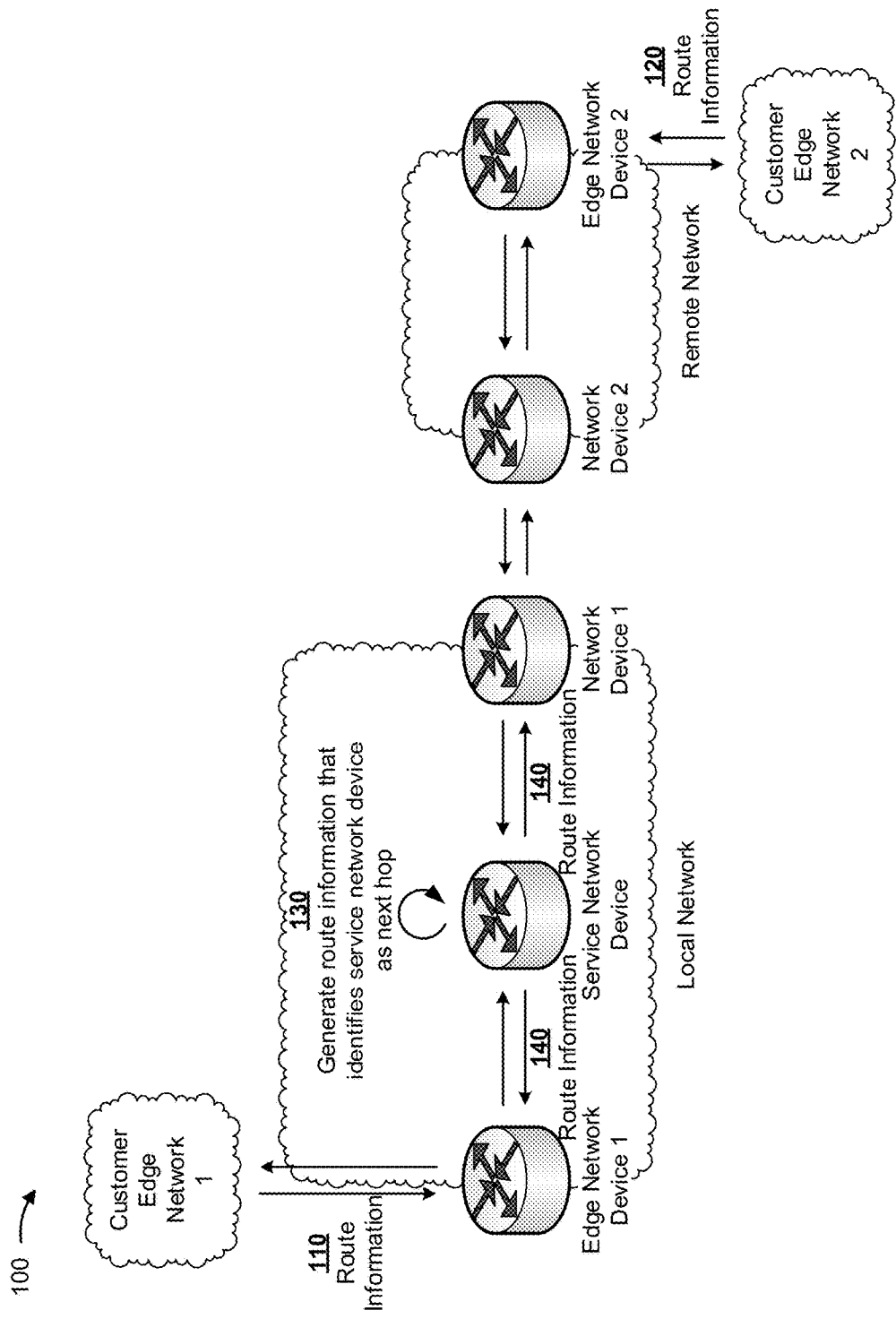
FIGS. 1A and 1B are diagrams of an overview of an example implementation described herein.
Figure 1B:
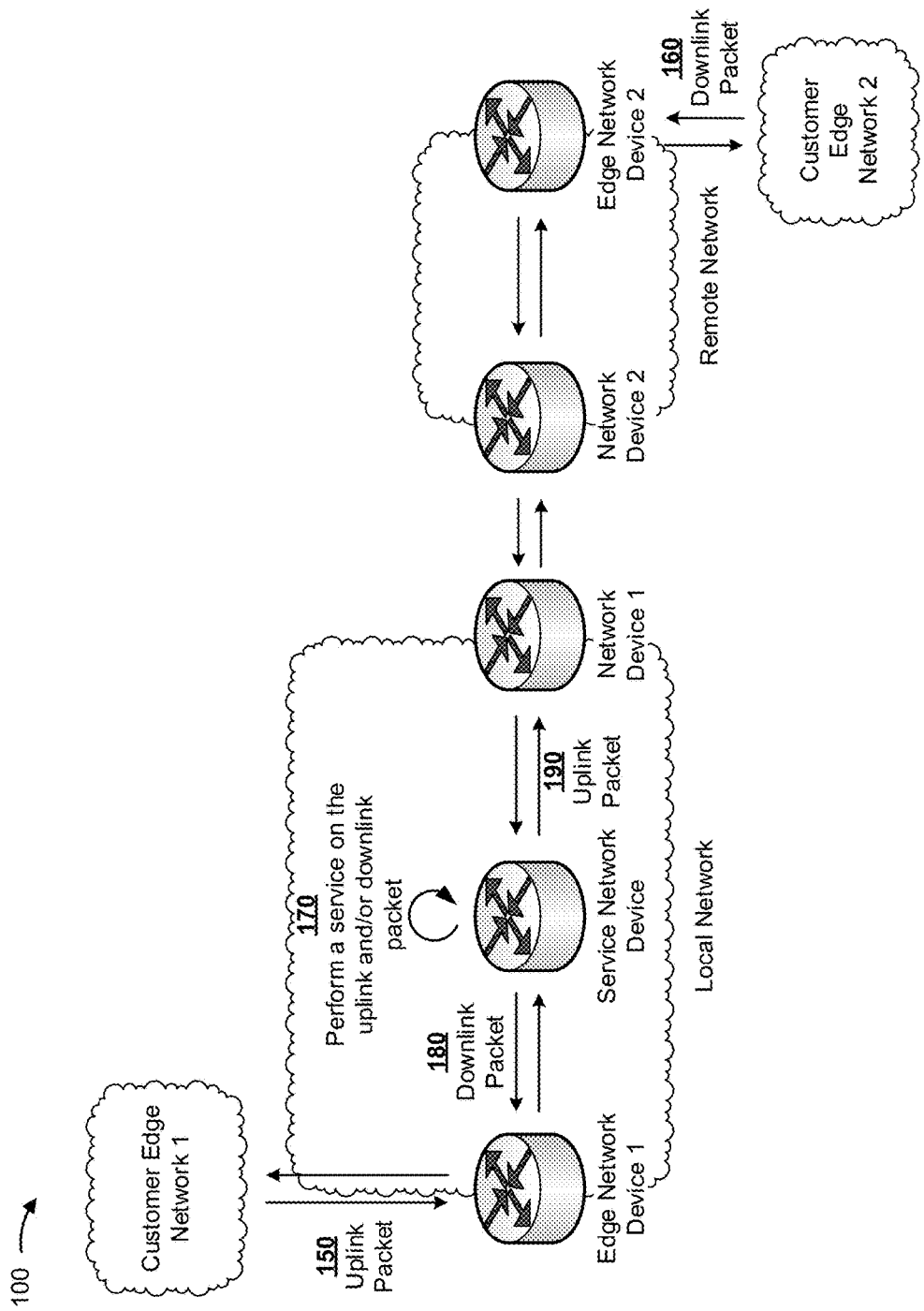

FIGS. 1A and 1B are diagrams of an overview of an example implementation 100 described herein. Example implementation 100 includes a customer edge network 1, a local network, a remote network, and a customer edge network 2. The local network includes an edge network device 1, a service network device, and a network device 1 (e.g., a border network device at a border between the local AS and the remote AS). The remote network includes a network device 2 (e.g., another border network device) and an edge network device 2.

As shown in FIG. 1A, and by reference number 110, a device of customer edge network 1 may provide route information to edge network device 1. For example, the device of customer edge network 1 may provide a virtual private network (VPN) route, such as a layer three VPN (L3VPN) route, that identifies a path through a network toward a destination (e.g., a VPN of customer edge network 1). Edge network device 1 may provide the route information received from customer edge network 1 to the service network device. The route information as received from edge network device 1 may include information identifying edge network device 2, or a destination associated with customer edge network 1, as a next hop, or destination, for a packet destined for customer edge network 2.

As shown by reference number 120, a device of customer edge network 2 may provide route information to edge network device 2. The route information may be similar to that described above with respect to reference number 110. The route information provided to edge network device 2 may include information that identifies edge network device 1, or a destination associated with customer edge network 1, as a next hop for a packet destined for customer edge network 1. Edge network device 2 may provide the route information received from customer edge network 2 to network device 2. Network device 2 may provide the route information received from edge network device 2 to network device 1. Network device 1 may provide the route information received from network device 2 to the service network device.

As shown by reference number 130, the service network device may generate route information that identifies the service network device as a next hop. For example, the service network device may generate route information that identifies the service network device as the next hop for a packet from customer edge network 1 destined for customer edge network 2 (e.g., rather than edge network device 2 or a destination associated with customer edge network 2 being the next hop).

As another example, the service network device may generate route information that identifies the service network device as the next hop for a packet from customer edge network 2 destined for customer edge network 1 (e.g., rather than edge network device 1 or a destination associated with customer edge network 1 being the next hop). In this way, the service network device may be prevented from automatically forwarding a packet with a label when the service network device receives the packet and is not the destination of the packet.

As shown by reference number 140, the service network device may provide the route information. For example, the service network device may provide the route information to edge network devices 1 and 2, network devices 1 and 2, and/or devices of customer edge networks 1 and 2. In this way, edge network devices 1 and 2, network devices 1 and 2, and/or devices of customer edge networks 1 and 2 may have the generated route information to use when providing a packet.

As shown in FIG. 1B, and by reference number 150, a device of customer edge network 1 may provide an uplink packet, destined for customer edge network 2, to edge network device 1. For example, the device of customer edge network 1 may provide an uplink packet that has a label that identifies the service network device as the next hop for the packet (e.g., based on the route information generated by the service network device). Edge network device 1 may provide the uplink packet received from customer edge network 1 to the service network device.

As shown by reference number 160, a device of customer edge network 2 may provide a downlink packet, destined for customer edge network 1, to edge network device 2. The device of customer edge network 2 may provide a packet similar to that described with respect to reference number 150. Edge network device 2 may provide the downlink packet received from customer edge network 2 to network device 2. Network device 2 may provide the downlink packet received from edge network device 2 to network device 1. Network device 1 may provide the downlink packet received from network device 2 to the service network device (e.g., based on the route information generated by the service network device identifying the service network device as the next hop).

As shown by reference number 170, the service network device may perform a service on the uplink and/or downlink packet (e.g., prior to sending the uplink and/or downlink packet toward a destination). For example, the service network device may determine a source identifier and/or a destination identifier associated with the uplink and/or downlink packet and may compare the source and/or destination identifier to a set of source and/or destination identifiers stored by the service network device. Continuing with the previous example, when this comparison indicates a match, the service network device may perform a service on the packet, such as a firewall service, a deep packet inspection service, and/or the like. In this way, the service network device may perform a service on a packet with a label when the service network device would not otherwise be capable of performing the service (e.g., due to the uplink/downlink packets being destined for destinations of customer edge networks 1 and 2).

In addition, the service network device may identify a destination, or next hop, to which to provide the uplink/downlink packets (e.g., using a lookup/forwarding table).

For example, the service network device may identify edge network device 1 as a destination, or next hop, for a downlink packet destined for customer edge network 1. As another example, the service network device may identify edge network device 2 as a destination, or next hop, for an uplink packet destined for customer edge network 2.

As shown by reference number 180, the service network device may provide the downlink packet received from network device 1 to edge network device 1 (e.g., after performing the service on the downlink packet), which may provide the downlink packet toward a destination associated with customer edge network 1. As shown by reference number 190, the service network device may provide the uplink packet from edge network device 1 to network device 1 (e.g., after performing the service on the uplink packet), which may provide the uplink packet toward a destination associated with customer edge network 2 via edge network device 2.

In this way, a service network device may perform a service on a packet with a label when the service network device is not the destination of the packet. This increases security of a local network (e.g., a local AS), a remote network (e.g., a remote AS), and/or another type of network by enabling the service network device to perform a service on the packet prior to sending the packet toward a destination. In addition, this improves network communications, and/or conserves processing resources that would be consumed due to providing an un-serviced packet.

As indicated above, FIGS. 1A and 1B are provided merely as an example. Other examples are possible and may differ from what was described with regard to FIGS. 1A and 1B.

Figure 2:
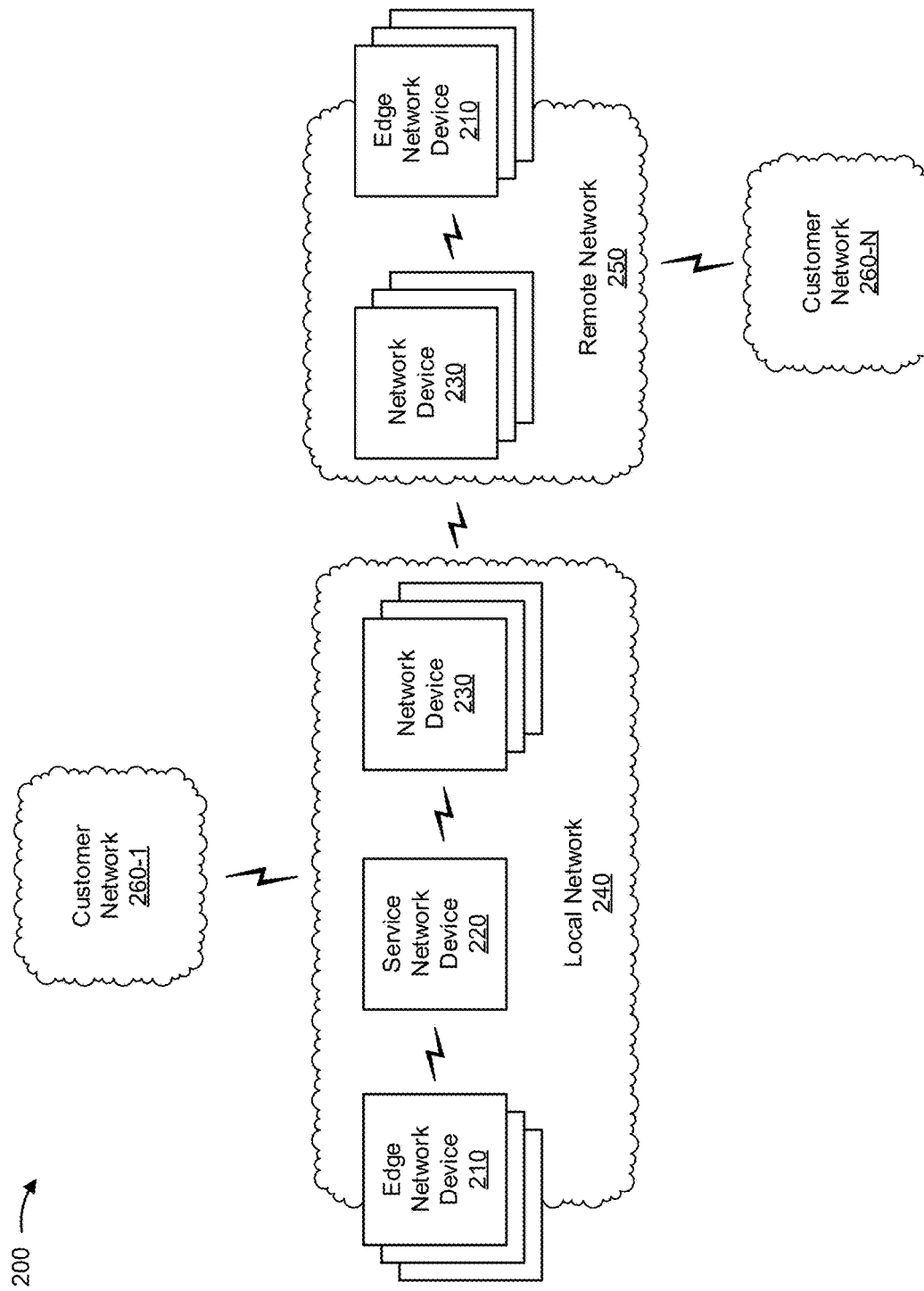
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of edge network devices 210 (hereinafter referred to collectively as "edge network devices 210," and individually as "edge network device 210"), a service network device 220, a set of network devices 230 (hereinafter referred to collectively as "network devices 230," and individually as "network device 230"), a local network 240, a remote network 250, and one or more customer networks 260-1 through 260-N (N≥1) (hereinafter referred to collectively as "customer networks 260," and individually as "customer network 260"). Devices of environment 200 may interconnect via wired connections, wireless connections, or a combination of wired and wireless connections.

Edge network device 210 includes one or more devices (e.g., one or more traffic transfer devices) capable of receiving, storing, generating, processing, and/or providing information, such as route information that identifies a route between devices. For example, edge network device 210 may include a router, a gateway, a switch, a hub, a bridge, a firewall, a reverse proxy, a server (e.g., a proxy server), a security device, an intrusion detection device, a load balancer, or a similar type of device. In some implementations, edge network device 210 may include a virtual implementation of a device, such as a virtual routing and forwarding (VRF) instance (referred to herein as "VRF") executing on a device. In some implementations, edge network device 210 may be located at an edge of a network (e.g., local network 240 and/or remote network 250) and may provide connectivity with customer network 260, as described elsewhere herein. In some implementations, edge network device 210 may provide route information and/or a packet to service network device 220, as described elsewhere herein. Additionally, or alternatively, edge network device 210 may receive generated route information and/or a packet from service network device 220, as described elsewhere herein.

Service network device 220 includes one or more devices (e.g., one or more traffic transfer devices) capable of receiving, storing, generating, processing, and/or providing information, such as route information that identifies a route between devices. For example, service network device 220 may include a router, an AS border router (ASBR), a gateway, a switch, a hub, a bridge, a firewall, a reverse proxy, a server (e.g., a proxy server), a security device, an intrusion detection device, a load balancer, or a similar type of device. In some implementations, service network device 220 may include a virtual implementation of a device, such as a VRF instance executing on a device. In some implementations, service network device 220 may be located between edge network device 210 and network device 230 in a network topology and may provide a service to a packet (e.g., a packet provided between edge network device 210 and network device 230, provided between local network 240 and remote network 250, etc.), as described elsewhere herein.

In some implementations, service network device 220 may receive route information and/or a packet from edge network device 210 and/or network device 230, as described elsewhere herein. Additionally, or alternatively, service network device 220 may generate and provide route information and/or a packet to edge network device 210 and/or network device 230, as described elsewhere herein.

Network device 230 includes one or more devices (e.g., one or more traffic transfer devices) capable of receiving, storing, generating, processing, and/or providing information, such as route information that identifies a route between devices. For example, network device 230 may include a router, a route reflector, an ASBR, a gateway, a switch, a hub, a bridge, a firewall, a reverse proxy, a server (e.g., a proxy server), a security device, an intrusion detection device, a load balancer, or a similar type of device. In some implementations, network device 230 may include a virtual device, such as a VRF executing on a device. In some implementations, network device 230 may provide route information and/or a packet to service network device 220, as described elsewhere herein. Additionally, or alternatively, network device 230 may receive generated route information and/or a packet from service network device 220, as described elsewhere herein.

Local network 240 includes one or more wired and/or wireless networks (e.g., local to service network device 220). For example, local network 240 may include an AS, a cellular network (e.g., a long-term evolution (LTE) network, a code division multiple access (CDMA) network, a 3G network, a 4G network, a 5G network, another type of advanced generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Remote network 250 includes one or more wired and/or wireless networks (e.g., remote to service network device 220). For example, remote network 250 may include an AS, a cellular network (e.g., an LTE network, a CDMA network, a 3G network, a 4G network, a 5G network, another type of advanced generation network, etc.), a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks.

Customer network 260 includes one or more wired and/or wireless networks. For example, customer network 260 may include a private network, a virtual private network (VPN), a cellular network (e.g., an LTE network, a CDMA network, a 3G network, a 4G network, a 5G network, another type of advanced generation network, etc.), a PLMN, a LAN, a WAN, a MAN, a telephone network (e.g., the PSTN), an ad hoc network, an intranet, the Internet, a fiber optic-based network, a cloud computing network, or the like, and/or a combination of these or other types of networks The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
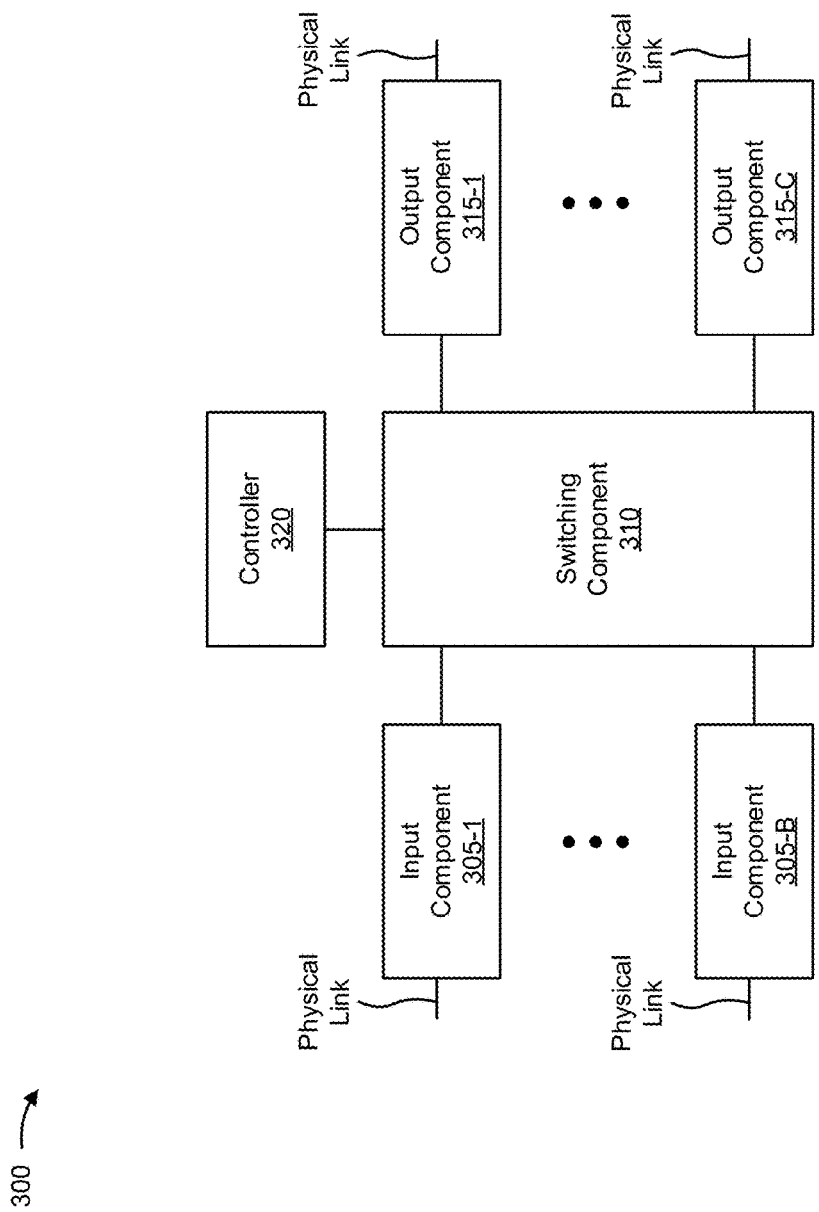
FIG. 3 is a diagram of example components of one or more devices of FIG. 2.

FIG. 3 is a diagram of example components of a device 300. Device 300 may correspond to edge network device 210, service network device 220, and/or network device 230. In some implementations, edge network device 210, service network device 220, and/or network device 230 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
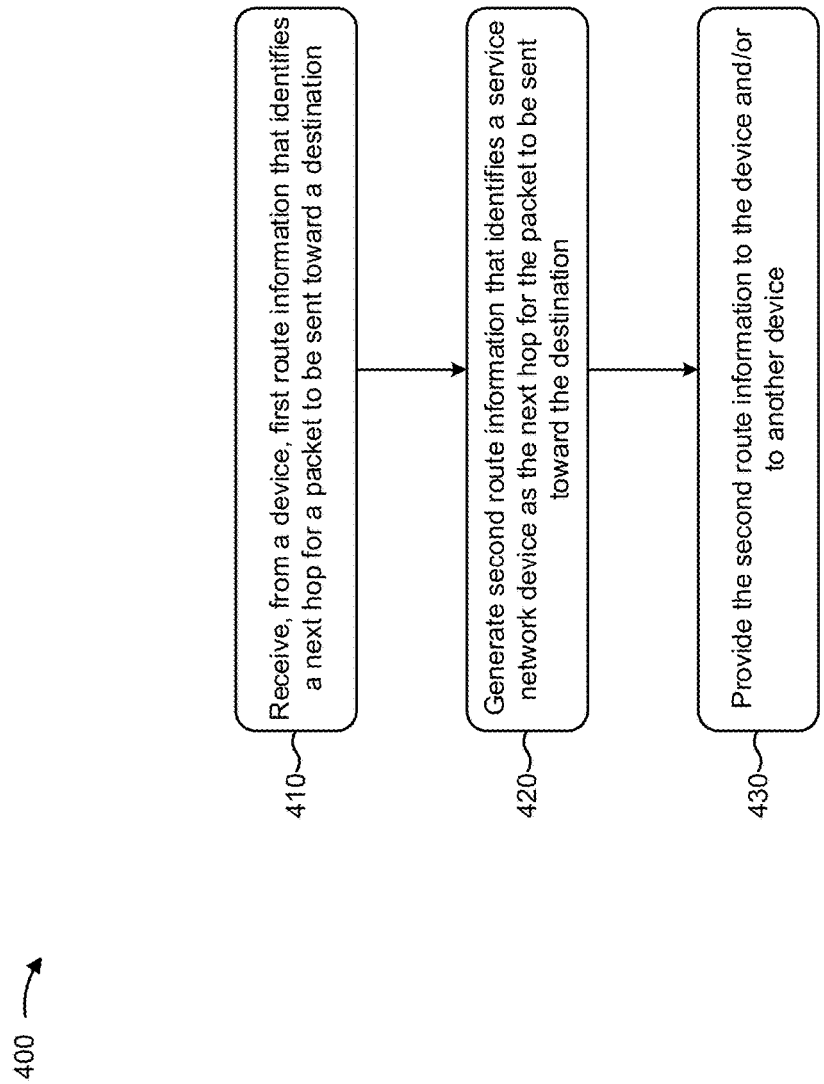
FIG. 4 is a flow chart of an example process for generating route information to permit performing of a service on a packet.

FIG. 4 is a flow chart of an example process 400 for generating route information to permit performing a service on packet. In some implementations, one or more process blocks of FIG. 4 may be performed by service network device 220. In some implementations, one or more process blocks of FIG. 4 may be performed by another device or a group of devices separate from or including service network device 220, such as edge network device 210 and network device 230.

As shown in FIG. 4, process 400 may include receiving, from a device, first route information that identifies a next hop for a packet to be sent toward a destination (block 410). For example, service network device 220 may receive the first route information from edge network device 210 and/or network device 230. In some implementations, the first route information may identify a device, such as edge network device 210, network device 230, and/or a device of customer network 260 as a next hop for a packet to be sent toward a destination other than service network device 220. A packet may refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

In some implementations, service network device 220 (e.g., a service ASBR) may receive the first route information as part of a protocol (e.g., an external border gateway protocol (EBGP), an internal border gateway protocol (IBGP), or a resource reservation protocol (RSVP) traffic engineering (TE) (RSVP-TE) protocol), such as via a route advertisement. Additionally, or alternatively, service network device 220 may receive the first route information periodically, according to a schedule, based on a request from service network device 220, based on a user providing input to the device from which the first route information is received, and/or the like. In some implementations, service network device 220 may receive the first route information from a local device, such as a local edge network device 210 and/or a local network device 230. In some implementations, a "local" device may be associated with local network 240 (e.g., the same network as service network device 220).

Additionally, or alternatively, service network device 220 may receive the first route information from a remote device, such as a remote network device 230 and/or a remote edge network device 210. In some implementations, a "remote" device may be associated with remote network 250 (e.g., a different network than service network device 220).

In some implementations, service network device 220 may receive the first route information via a label switched path (LSP). For example, service network device 220 may receive first route information via an LSP between edge network device 210 and service network device 220, between service network device 220 and network device 230, between local network 240 and remote network 250 (e.g., an inter-AS LSP), and/or the like.

In some implementations, the first route information may include information that identifies a path via a network toward a particular destination (e.g., edge network device 210, network device 230, a virtual private network (VPN) of customer network 260, etc.)). For example, the first route information may include a layer three virtual private network (L3VPN) route, a labeled Internet protocol route (e.g., an Internet protocol version four (IPv4) route, an Internet protocol version six (IPv6) route, etc.), and/or the like.

In some implementations, the first route information may include a source identifier that identifies a source from which a packet is provided. For example, the source identifier may identify a particular edge network device 210, network device 230, and/or device of customer network 260 that provided the first route information and which may provide a packet. In some implementations, a source identifier may include an IP address for the source of a packet, a routing prefix of a source of the packet, source class usage information of a source of the packet, and/or the like.

Additionally, or alternatively, the first route information may include a destination identifier that identifies a destination toward which a packet may be provided. For example, the destination identifier may identify a particular edge network device 210, network device 230, and/or device of customer network 260 that provided the first route information and to which a packet may be provided. In some implementations, a destination identifier may include an IP address for the destination of a packet, a routing prefix of a destination of the packet, source class usage information of a destination of the packet, and/or the like. In this way, service network device 220 may determine a direction of a packet (e.g., uplink from local network 240 to remote network 250 or downlink from remote network 250 to local network 240).

In some implementations, service network device 220 may store the first route information and the source/destination identifiers. For example, service network device 220 may store the first route information and the source/destination identifiers such that a source or destination of a packet may be identified based on receiving the packet and such that service network device 220 may identify a route from service network device 220 to a destination of the packet based on receiving the packet. In this way, service network device 220 may be permitted to provide a packet received by service network device 220 toward a destination.

In this way, service network device 220 may receive first route information that identifies a next hop for a packet to be sent toward a destination.

As further shown in FIG. 4, process 400 may include generating second route information that identifies a service network device as the next hop for the packet to be sent toward the destination (block 420). For example, service network device 220 may generate second route information that identifies service network device 220 as the next hop for a packet sent from edge network device 210, network device 230, and/or a device of customer network 260 toward a destination other than service network device 220.

In some implementations, the second route information may identify service network device 220 as the next hop for an inter-network packet (e.g., an inter-AS packet provided between multiple ASs). For example, the second route information may identify service network device 220 as the next hop for a packet sent from local network 240 to remote network 250, from remote network 250 to local network 240, from a first customer network 260 to a second customer network 260 via local network 240, and/or the like.

In this way, service network device 220 may generate second route information that causes a packet sent via local network 240 to be received by service network device 220 so that a service may be performed on the packet (e.g., rather than having service network device 220 automatically forward the packet based on a label associated with the packet, or other information encapsulating the content of the packet that is used to make forwarding decisions).

As further shown in FIG. 4, process 400 may include providing the second route information to the device and/or to another device (block 430). For example, service network device 220 may provide the second route information to edge network device 210, network device 230, a device of customer network 260, and/or the like. In some implementations, service network device 220 may provide the second route information when service network device 220 generates the second route information, based on a network administrator associated with service network device 220 providing input to service network device 220, when service network device 220 has generated a threshold amount of second route information (e.g., a threshold quantity of routes), periodically, according to a schedule, and/or the like.

In some implementations, service network device 220 may provide the second route information using a protocol. For example, service network device 220 may advertise the second route information according to EBGP and/or IBGP (e.g., using a next-hop-self function of the protocol). In this way, service network device 220 may efficiently provide the second route information to devices of local network 240, remote network 250, and/or customer network 260, thereby conserving processing resources.

In this way, service network device 220 may establish a control plane by providing the second route information. For example, the control plane may include service network device 220 as a next hop for a packet. In some implementations, the control plane may be utilized by a device to provide a packet (e.g., an uplink packet and/or a downlink packet) via local network 240.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
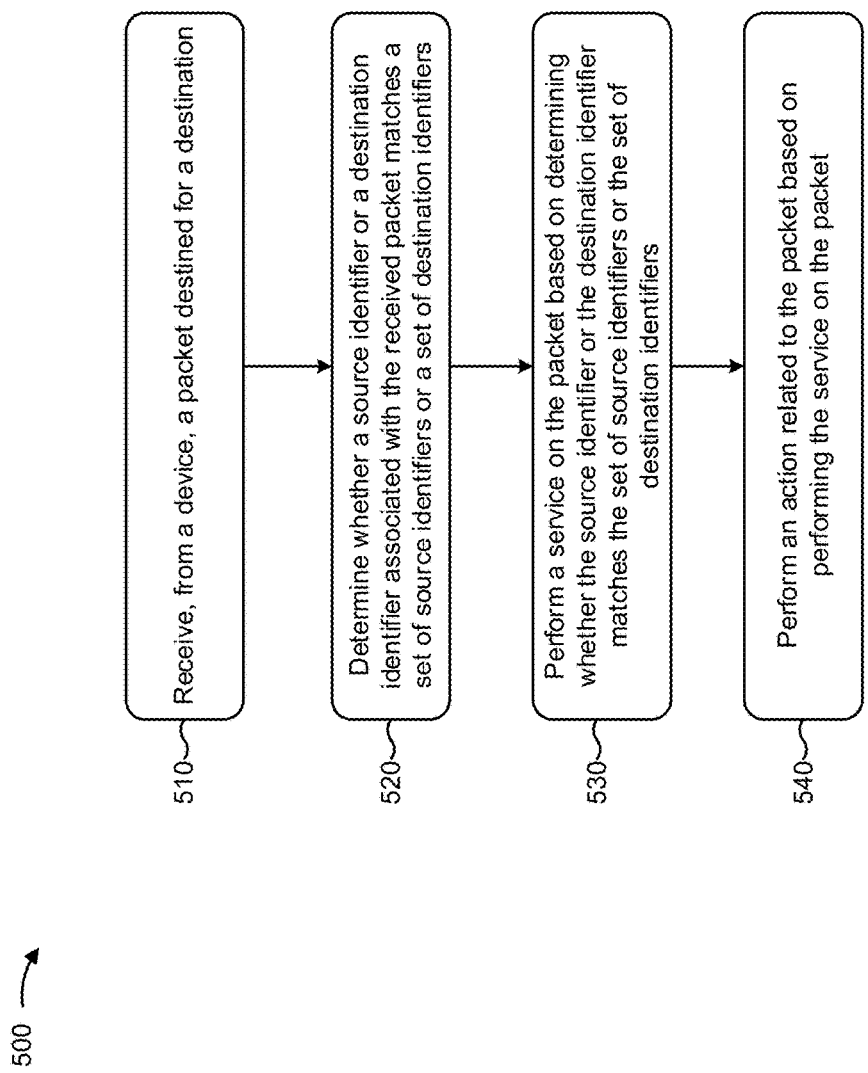
FIG. 5 is a flow chart of an example process for performing a service on a packet.

FIG. 5 is a flow chart of an example process 500 for performing a service on a packet. In some implementations, one or more process blocks of FIG. 5 may be performed by service network device 220. In some implementations, one or more process blocks of FIG. 5 may be performed by another device or a group of devices separate from or including service network device 220, such as edge network device 210 and network device 230.

As shown in FIG. 5, process 500 may include receiving, from a device, a packet destined for a destination (block 510). For example, service network device 220 may receive a packet from a VRF of edge network device 210 associated with local network 240 and/or a VRF of a device of remote network 250, such as a remote edge network device 210 and/or a remote network device 230. In some implementations, the packet may include a destination identifier that indicates that the packet is destined for a destination other than service network device 220, such as a VPN of customer network 260 (e.g., indicating that service network device 220 is to send the packet toward a destination). In some implementations, service network device 220 may use the destination identifier to determine a service to perform on the packet, to determine a next hop to which service network device 220 is to provide the packet (e.g., after servicing), and/or the like.

In some implementations, service network device 220 may receive the packet based on the device using route information provided by service network device 220. For example, the route information provided by service network device 220 may identify service network device 220 as a next hop for a packet via local network 240 (e.g., to/from customer network 260).

In some implementations, service network device 220 may process a packet using a firewall (e.g., a stateless firewall or a stateful firewall). For example, a VRF of service network device 220 may receive the packet and may process the packet using a stateless firewall. In some implementations, service network device 220 may receive a packet via a label-switched-path (e.g., when the packet is encapsulated using a label), such as in a multiprotocol label switching (MPLS) network.

In this way, service network device 220 may receive a packet destined for a destination other than service network device 220, when the packet would ordinarily be provided via service network device 220 without service network device 220 having an opportunity to service the packet.

As further shown in FIG. 5, process 500 may include determining whether a source identifier or a destination identifier associated with the received packet matches a set of source identifiers or a set of destination identifiers (block 520). For example, service network device 220 may determine whether a source identifier or a destination identifier associated with the received packet matches a set of source identifiers or a set of destination identifiers. In some implementations, service network device 220 may perform the comparison by analyzing information associated with the packet, such as a label, to identify the source identifier and/or the destination identifier. Additionally, or alternatively, service network device 220 may determine whether the identified source identifier and/or destination identifier match a set of source identifiers or a set of destination identifiers using a data structure that includes known source identifiers and/or known destination identifiers.

In some implementations, a source identifier may identify a source from which a packet originated. For example, a source identifier may include information identifying an Internet protocol (IP) address of a source of the packet, a routing prefix of a source of the packet, source class usage information of a source of the packet, and/or the like. In some implementations, a destination identifier may identify a destination toward which the packet is being provided (e.g., a destination other than service network device 220). For example, a destination identifier may include information identifying an IP address of a destination of a packet, a routing prefix of a destination of the packet, destination class usage information of a destination of the packet and/or the like.

In some implementations, service network device 220 may perform a comparison of a source identifier associated with the received packet and a set of source identifiers. For example, service network device 220 may perform a comparison of a source identifier and a set of source identifiers when the packet is received from a device of remote network 250 (e.g., a downlink transmission of the packet, where the packet is destined for a device of local network 240 and/or customer network 260 connected to local network 240). In some implementations, service network device 220 may determine whether the comparison indicates a match.

In some implementations, service network device 220 may perform a comparison of a destination identifier associated with the received packet and a set of stored destination identifiers. For example, service network device 220 may perform a comparison of a destination identifier and a set of destination identifiers when the packet is received from a device of local network 240 (e.g., an uplink transmission of the packet, where the packet is destined for remote network 250 and/or customer network 260 connected to remote network 250). In some implementations, service network device 220 may determine whether the comparison indicates a match.

In this way, service network device 220 may determine whether a source identifier and/or a destination identifier of a received packet matches a stored set of source identifiers and/or destination identifiers. This enables service network device 220 to dynamically perform a service on the packet based on a source or destination of the packet.

As further shown in FIG. 5, process 500 may include performing a service on the packet based on determining whether the source identifier or the destination identifier matches the set of source identifiers or the set of destination identifiers (block 530). For example, service network device 220 may perform the service. In some implementations, service network device 220 may perform the service based on performing a comparison of a source identifier and/or a destination identifier associated with the packet and a set of source identifiers or a set of destination identifiers stored by service network device 220.

In some implementations, when the comparison indicates that there is not a match, service network device 220 may determine to drop the packet. Additionally, or alternatively, when the comparison indicates that there is a match, service network device 220 may provide the packet. For example, service network device 220 may provide the packet to a service interface of a VRF of service network device 220 (e.g., that performs a service on the received packet).

In some implementations, a service may include implementing a rule of a firewall or a content filter (e.g., processing the packet using the firewall or content filter), implementing an intrusion detection technique, performing a deep packet inspection, performing a network address translation (NAT), providing a quality of service, and/or the like. In some implementations, service network device 220 may identify a particular VRF (e.g., of a plurality of VRFs) to perform the service. For example, service network device 220 may identify a particular VRF based on a source and/or destination identifier associated with the packet using a data structure that includes information identifying a source and/or destination of the packet, a corresponding VRF to perform a service on the packet, and/or a corresponding service to be performed by the VRF.

Additionally, or alternatively, service network device 220 may identify multiple VRFs (e.g., of a plurality of VRFs) to perform a service on the packet. For example, service network device 220 may identify the multiple VRFs using a data structure that identifies which VRFs are to perform which services, an order in which the multiple VRFs are to perform the services, and/or the like. As another example, service network device 220 may identify the VRFs, the services, the order in which the VRFs are to perform the services, and/or the like using an algorithm. In some implementations, the identified VRF(s) may be selected by service network device 220 and may perform the service(s) on the packet.

In some implementations, when service network device 220 performs the service, service network device 220 may perform the service on a content of the packet (e.g., despite receiving a packet that has a destination identifier, in the content of the packet, for a destination other than service network device 220). This improves security by enabling service network device 220 to perform a service on a packet that service network device 220 would otherwise send toward a destination without performing the service.

In some implementations, service network device 220 may mark the packet with an identifier that indicates that the packet has been serviced, has been processed by the firewall, and/or the like. For example, service network device 220 may mark the packet with a service-filter-hit identifier. This ensures that the packet is provided toward a destination of the packet and prevents the packet from being looped back to service network device 220 after servicing, thereby conserving processing resources of service network device 220 and conserving network resources.

In some implementations, service network device 220 may perform a lookup of route information for the received packet. For example, service network device 220 may use a data structure that includes a destination identifier to identify route information for the packet to be sent from service network device 220 (e.g., after performing the service on the packet).

In this way, service network device 220 may perform a service on a packet that service network device 220 would otherwise transmit without performing the service.

As further shown in FIG. 5, process 500 may include performing an action related to the packet based on performing the service on the packet (block 540). For example, service network device 220 may perform an action related to the packet based on performing the service on the packet.

In some implementations, service network device 220 may forward the packet toward a destination (e.g., a VRF of a device associated with local network 240 or remote network 250). Additionally, or alternatively, service network device 220 may drop the packet. Additionally, or alternatively, service network device 220 may make a copy of a packet (e.g., of the content of the packet, of the entire packet, etc.). Additionally, or alternatively, service network device 220 may provide information related to the packet to a client device of a network administrator. Additionally, or alternatively, service network device 220 may track a metric related to the packet, such as a size of the packet, a bit rate of multiple packets that include the packet, and/or the like. In some implementations, service network device 220 may generate a report that includes information identifying the metric and/or a value of the metric and may provide the report to a network administrator.

In this way, after a control plane is established, service network device 220 may perform an action on a packet as the packet is transmitted from/to local/remote edge network devices 210, local/remote network devices 230, and/or devices of customer network 260, via local network 240 and/or remote network 250.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
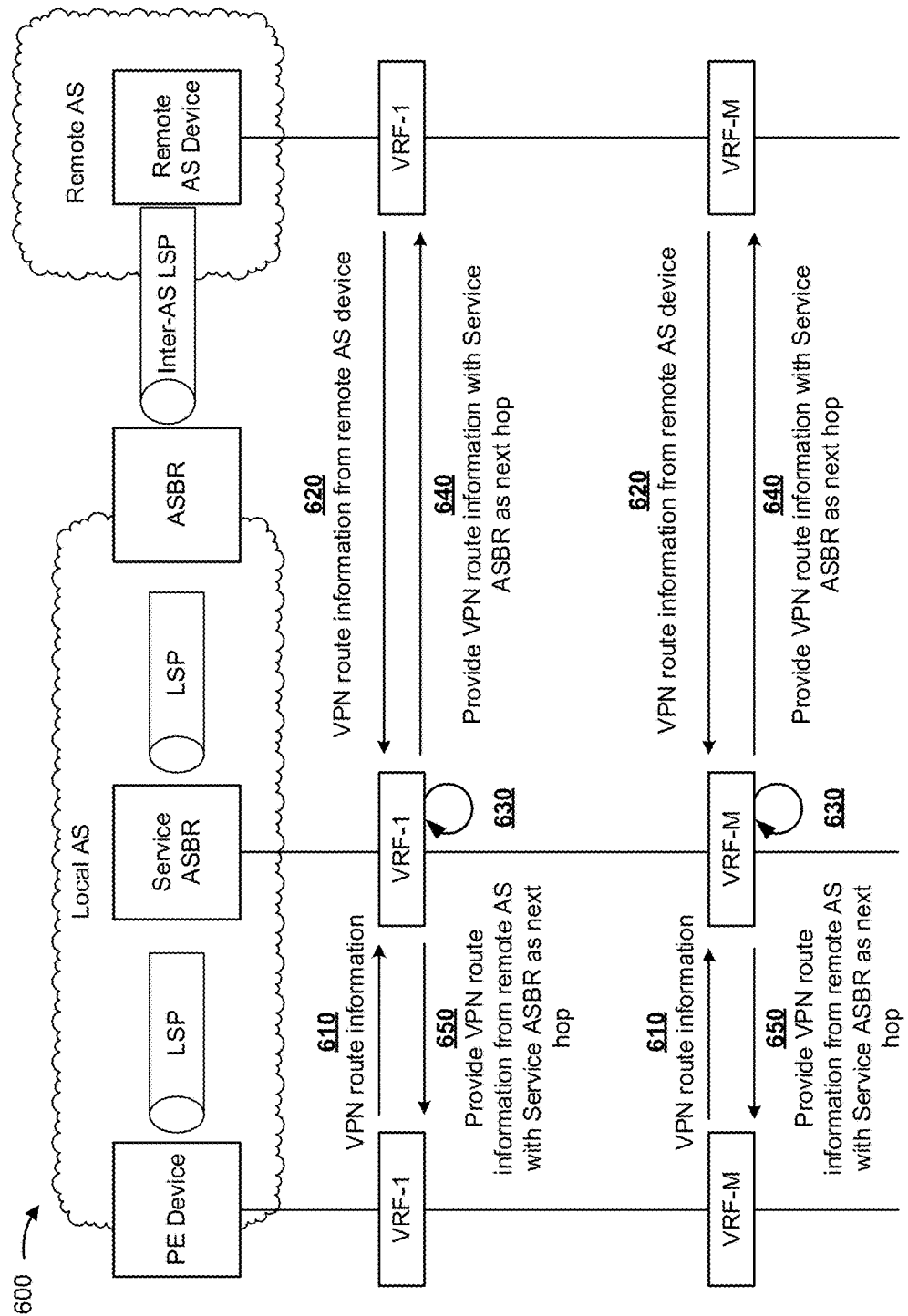
FIG. 6 is a diagram of an example implementation relating to the example process shown in FIG. 4.

FIG. 6 is a diagram of an example implementation 600 relating to example process 400 shown in FIG. 4. As shown in FIG. 6, example implementation 600 may include local network 240 (e.g., shown as a local AS) and remote network 250 (e.g., shown as a remote AS). The local AS may include edge network device 210 (e.g., shown as a provider edge (PE) device), service network device 220 (e.g., shown as a service ASBR), network device 230 (e.g., shown as an ASBR), a first label-switched path (LSP) between the PE device and the service ASBR, and a second LSP between the service ASBR and the ASBR. The remote AS may include an edge network device 210 and/or a network device 230 (e.g., shown as a remote AS device). Further, example implementation 600 may include an inter-AS LSP that provides connectivity between the local AS and the remote AS. Each of the PE device, the service ASBR, and the remote AS device may include one or more VRFs (e.g., VRF-1 through VRF-M (M≥1)) that are used to communicate.

In example implementation 600, the service ASBR may receive, from a device, route information for the device and generate new route information that identifies the service ASBR as the next hop for data destined for the device. In this way, a packet (e.g., a packet with a label) being provided between the PE device and the remote AS device may be provided to the service ASBR for servicing, rather than being automatically provided toward a destination without servicing or being serviced by the service ASBR after the service ASBR sends the packet towards the destination (e.g., where the packet is routed back to the service ASBR for servicing).

As shown by reference number 610, the PE device may provide VPN route information for a VPN of a first customer network 260 to the service ASBR via a VRF and the first LSP that are associated with the PE device and the service ASBR. In some implementations, the VPN route information may identify the PE device as a next hop for a packet from the remote AS device destined for the first customer network 260. As shown by reference number 620, the remote AS device may provide VPN route information for a VPN of a second customer network 260 from the remote AS device to the service ASBR via a VRF that are associated with the remote AS device and the service ASBR, the inter-AS LSP, and the second LSP. In some implementations, the VPN route information from the remote AS device may identify the remote AS device as a next hop for a packet destined for a VPN of the second customer network 260.

As shown by reference number 630, when the service ASBR receives the VPN route information from the PE device and the remote AS device, the service ASBR may generate new route information that identifies the service ASBR as the next hop. For example, the service ASBR may generate VPN route information that identifies the service ASBR, rather than the PE device, as a next hop for a packet destined for the first customer network 260. As another example, the service ASBR may generate VPN route information that identifies the service ASBR, rather than the remote AS device, as a next hop for a packet destined for the second customer network 260.

As shown by reference number 640, the service ASBR may provide, to the remote AS device via the VRF that are associated with the service ASBR and the remote AS device, the second LSP, and the inter-AS LSP, VPN route information identifying the service ASBR as the next hop for data destined for the first customer network 260. As shown by reference number 650, the service ASBR may provide, to the PE device via the VRF that are associated with the service ASBR and the PE device and the first LSP, VPN route information identifying the service ASBR as the next hop for data destined for the second customer network 260.

In this way, service network device 220 (e.g., a service ASBR) may generate and provide route information identifying service network device 220 as a next hop for a packet (e.g., may create a control plane for the packet). This prevents service network device 220 from automatically providing a packet (e.g., a packet with a label) when the packet is destined for a destination other than service network device 220 and permits service network device 220 to perform a service on the packet prior to providing the packet toward the destination, thereby increasing security related to providing the packet.

As indicated above, FIG. 6 is provided merely as an example. Other examples are possible and may differ from what was described with regard to FIG. 6.

Figure 7:
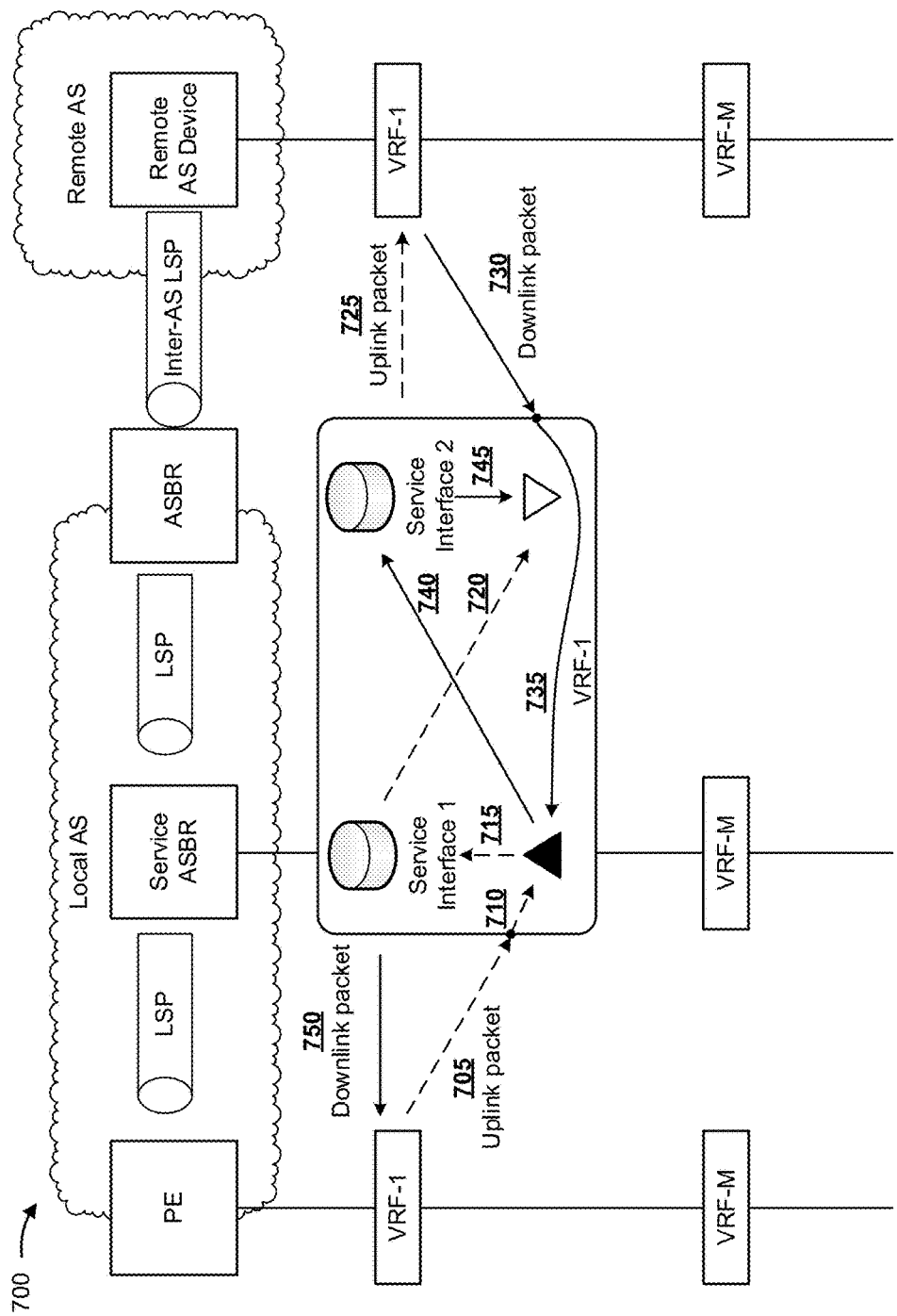
FIG. 7 is a diagram of an example implementation relating to the example process shown in FIG. 5.

FIG. 7 is a diagram of an example implementation 700 relating to example process 500 shown in FIG. 5. Example implementation 700 includes the local AS and the remote AS, as described above with respect to FIG. 6. The local AS includes the PE device, the first LSP, the second LSP, the service ASBR, and the ASBR, as described above with respect to FIG. 6. The remote AS includes the remote AS device, as described above with respect to FIG. 6. Further, example implementation 700 includes the inter-AS LSP, as described above with respect to FIG. 6. Each of the PE device, the service ASBR, and the remote AS device may have VRFs, as described above with respect to FIG. 6. In this example, a VRF of the service ASBR may include a stateless firewall (e.g., shown as a black triangle), a first service interface (e.g., shown as service interface 1) that services a packet from the PE device (e.g., an uplink packet), a second service interface (e.g., shown service interface 2) that services a packet from the remote AS device (e.g., a downlink packet), and a route lookup/forwarding table (e.g., shown as a white triangle).

In example implementation 700, the service ASBR may receive a packet, perform a service on the packet, and perform an action related to the packet based on performing the service. As shown by reference number 705, the PE device may provide an uplink packet (e.g., an uplink packet with a label) from the VRF associated with the PE device to the VRF associated with the service ASBR.

As shown by reference number 710, the service ASBR, using the VRF associated with the service ASBR, may receive the uplink packet and may provide the uplink packet to the stateless firewall. In some implementations, the service ASBR may use the stateless firewall to determine whether a destination identifier (e.g., destination class usage information) associated with the uplink packet matches a set of destination identifiers stored by the service ASBR. In some implementations, if the destination identifier associated with the uplink packet does not match the set of destination identifiers, then the service ASBR may drop the uplink packet, provide information related to the uplink packet to a client device of a network administrator, and/or the like. In some implementations, if the destination identifier associated with the uplink packet matches the set of destination identifiers, then, as shown by reference number 715, the service ASBR may provide the uplink packet to the first service interface. The service ASBR may use the first service interface to perform a service on the uplink packet, such as a deep packet inspection service.

As shown by reference number 720, the service ASBR may use the lookup/forwarding table to look up route information, or a next hop, to use to provide the uplink packet (e.g., by comparing information identifying a destination of the packet and a destination identifier included in the lookup/forwarding table). For example, the service ASBR may use the lookup/forwarding table to identify the remote AS device as the next hop for the uplink packet from the service ASBR. As shown by reference number 725, the service ASBR may provide the uplink packet to the VRF associated with the remote AS device based on determining that the remote AS device is the next hop for the uplink packet.

As shown by reference number 730, the remote AS device may provide a downlink packet (e.g., a downlink packet with a label) from the VRF associated with the remote AS device to the VRF associated with service ASBR. As shown by reference number 735, the service ASBR may use the VRF associated with service ASBR to receive the downlink packet, and may provide the downlink packet to the stateless firewall. In some implementations, the service ASBR may use the stateless firewall to determine whether a source identifier associated with the downlink packet matches a set of source identifiers stored by the service ASBR.

In some implementations, if the destination identifier associated with the downlink packet does not match the set of source identifiers, then the service ASBR may drop the downlink packet, provide information related to the downlink packet to a client device of a network administrator, and/or the like. In some implementations, if the source identifier associated with the downlink packet matches the set of source identifiers, then, as shown by reference number 740, the service ASBR may forward the downlink packet to the second service interface. In some implementations, the service ASBR may use the second service interface to perform a service on the downlink packet.

As shown by reference number 745, the service ASBR may use the lookup/forwarding table to identify route information, or a next hop, for the downlink packet. For example, the service ASBR may use the lookup/forwarding table to identify the PE device as the next hop for the downlink packet from the service ASBR. As shown by reference number 750, the service ASBR may provide the downlink packet to the PE device by providing the packet from the VRF of the service ASBR to the VRF associated with PE device.

In this way, service network device 220 (e.g., a service ASBR) may receive a packet, such as a packet with a label, that is destined for a destination other than service network device 220, and may perform a service on the packet prior to sending the packet toward the destination.

As indicated above, FIG. 7 is provided merely as an example. Other examples are possible and may differ from what was described with regard to FIG. 7.

Implementations described herein enable a service network device, associated with a local AS (or other type of network), to perform a service on a packet, such as a packet that has a label (e.g., prior to forwarding the packet based on the label), when the packet is not destined for the service network device. In this way, the service network device increases security by performing the service prior to forwarding the packet (e.g., within the local AS, to a remote AS, or to another type of network). In addition, this improves network communications and/or conserves processing resources that would be consumed due to an un-serviced packet, such as when the packet contains a virus or other malicious software.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:

a memory; and one or more processors to:

receive first route information from a second device, the first route information identifying the second device as a next hop for a packet to be sent toward a destination other than the first device, and the first route information including a source identifier that identifies a source from which the packet is provided;

generate second route information based on receiving the first route information, the second route information identifying the first device as the next hop for the packet when the packet is to be sent toward the destination;

provide the second route information to a third device based on generating the second route information, the third device being the source of the packet;

receive the packet from the third device after providing the second route information to the third device;

perform a service on the packet based on receiving the packet from the third device, the service being performed on the packet prior to providing the packet to the second device, the first device performing the service based on the first device being identified by the second route information as the next hop for the packet; and perform an action related to the packet based on performing the service on the packet, the action including:

providing the packet toward the destination, via the second device, according to the first route information, or dropping the packet.

2. The first device of claim 1, where the one or more processors are further to:

determine whether the source identifier matches a set of source identifiers stored by the first device based on receiving the packet, or determine whether a destination identifier associated with the packet matches a set of destination identifiers stored by the first device based on receiving the packet, the destination identifier identifying the destination of the packet; and where the one or more processors, when performing the service, are to:

perform the service based on determining whether the source identifier matches the set of source identifiers or the destination identifier matches the set of destination identifiers.

3. The first device of claim 1, where the one or more processors are further to:

process the packet using a firewall or a filter based on receiving the packet; and where the one or more processors, when performing the service, are to:

perform the service based on processing the packet using the firewall or the filter.

4. The first device of claim 1, where the one or more processors are further to:

perform a lookup to identify the destination of the packet based on performing the service; and where the one or more processors, when performing the action, are to:

provide the packet toward the destination, via the second device, based on performing the lookup.

5. The first device of claim 1, where the one or more processors are further to:

store third route information based on generating the second route information, the third route information identifying the second device as the next hop to which the first device is to provide the packet after performing the service; and provide the packet to the second device using the third route information based on storing the third route information.

6. The first device of claim 1, where the packet includes:

a label encapsulating a content of the packet, the label being used to identify the next hop for the packet, and other information in the content of the packet identifying the source or the destination of the packet.

7. The first device of claim 1, where:

the first device is associated with a first network, the second device or the third device is associated with the first network, and another of the second device or the third device is associated with a second network that is different from the first network.

8. A non-transitory computer-readable medium storing instructions, the instructions comprising:

one or more instructions that, when executed by one or more processors of a first device, cause the one or more processors to:

receive first route information from a second device, the first route information identifying a first route to the second device for a packet to be provided toward a destination via the second device;

generate second route information based on receiving the first route information, the second route information identifying a second route to the first device for the packet;

provide the second route information to a third device based on generating the second route information, the packet to be received by the first device based on the second route information;

receive the packet from the third device via the second route after providing the second route information to the third device;

perform a service on the packet based on receiving the packet from the third device, the service being performed on the packet prior to providing the packet to the second device, the first device performing the service based on being identified by the second route information as a next hop for the packet; and perform an action related to the packet based on performing the service on the packet, the action including:

providing the packet toward the destination, via the second device, according to the first route information, or dropping the packet.

9. The non-transitory computer-readable medium of claim 8, where the one or more instructions, when executed by the one or more processors, further cause the one or more processors to:

determine a source or the destination of the packet based on receiving the packet from the third device; and where the one or more instructions, that cause the one or more processors to perform the service, cause the one or more processors to:

perform the service based on determining the source or the destination of the packet.

10. The non-transitory computer-readable medium of claim 9, where the one or more instructions, when executed by the one or more processors, further cause the one or more processors to:

determine whether the packet is being provided to or from a remote network based on receiving the packet from the third device; and where the one or more instructions, that cause the one or more processors to determine the source or the destination of the packet, cause the one or more processors to:

determine the source of the packet based on determining that the packet is being provided from the remote network.

11. The non-transitory computer-readable medium of claim 9, where the one or more instructions, when executed by the one or more processors, further cause the one or more processors to:

determine whether the packet is being provided to or from a remote network based on receiving the packet from the third device; and where the one or more instructions, that cause the one or more processors to determine the source or the destination of the packet, cause the one or more processors to:
  determine the destination of the packet based on determining that the packet is being provided to the remote network.

12. The non-transitory computer-readable medium of claim 8, where the one or more instructions, when executed by the one or more processors, further cause the one or more processors to:
  process the packet using a stateless firewall based on receiving the packet from the third device;
  perform a lookup of the destination based on processing the packet using the stateless firewall; and
  provide the packet toward the destination based on performing the lookup of the destination.

13. The non-transitory computer-readable medium of claim 8, where the one or more instructions, when executed by the one or more processors, further cause the one or more processors to:
  store information identifying the second device as the next hop for the packet to be received by the first device based on receiving the first route information;
  identify the second device as the next hop for the packet after receiving the packet based on storing the information identifying the second device as the next hop; and
  provide the packet to the second device based on identifying the second device as the next hop for the packet.

14. The non-transitory computer-readable medium of claim 8, where the service includes:
  an intrusion detection service,
  a deep packet inspection service, or
  a network address translation service.

15. A method, comprising:
  receiving, by a first device and from a second device, first route information,
    the first route information identifying the second device as a next hop for a packet;
  generating, by the first device, second route information based on receiving the first route information,
    the second route information identifying the first device as the next hop for the packet;
  providing, by the first device, the second route information to a third device based on generating the second route information,
    the second route information permitting the third device to provide the packet to the first device;
  receiving, by the first device and from the third device, the packet after providing the second route information to the third device,
    the first device receiving the packet from the third device based on the second route information identifying the first device as the next hop for the packet;
  performing, by the first device, a service on the packet based on receiving the packet from the third device; and
  performing, by the first device, an action related to the packet based on performing the service on the packet, the action including:
    providing the packet toward a destination, via the second device, according to the first route information, or
    dropping the packet.

16. The method of claim 15, further comprising:
processing the packet using a firewall of the first device based on receiving the packet;
determining a source or the destination of the packet after processing the packet using the firewall,
  the source or the destination of the packet being identified by a content of the packet; and
where performing the service comprises:
  performing the service based on determining the source or the destination of the packet from the content of the packet.

17. The method of claim 15, further comprising:
storing the first route information based on receiving the first route information;
identifying the second device as the next hop to which the packet is to be sent after the first device receives the packet based on storing the first route information; and
where performing the action comprises:
  providing the packet from the first device to the second device based on identifying the second device as the next hop to which the packet is to be sent after the first device.

18. The method of claim 15, where the packet is to be provided from a first autonomous system associated with the first device and the third device to a second autonomous system associated with the second device.

19. The method of claim 15, where:
the first device is an autonomous system border device between the second device and the third device in a network topology,
  the first device, the second device, and the third device being configured with one or more virtual routing and forwarding (VRF) instances executing on the first device, the second device, and the third device.

20. The method of claim 15, further comprising:
recording a value of a metric related to the packet based on performing the service on the packet; and
generating a report that includes information identifying the value of the metric based on recording the value of the metric.

* * * * *